United States Patent
Oh et al.

(10) Patent No.: US 7,326,268 B2
(45) Date of Patent: Feb. 5, 2008

(54) MULTI CYCLONE VESSEL DUST COLLECTING APPARATUS FOR VACUUM CLEANER

(75) Inventors: Jang-keun Oh, Gwangju (KR); Jung-gyun Han, Busan (KR)

(73) Assignee: Samsung Gwangju Electronics Co., Ltd., Gwanju (KR)

( * ) Notice: Subject to any disclaimer, the term of this patent is extended or adjusted under 35 U.S.C. 154(b) by 405 days.

(21) Appl. No.: 11/006,867

(22) Filed: Dec. 8, 2004

(65) Prior Publication Data
US 2005/0252179 A1 Nov. 17, 2005

(30) Foreign Application Priority Data
May 14, 2004 (KR) .................. 10-2004-0034185

(51) Int. Cl.
*B01D 45/12* (2006.01)
(52) U.S. Cl. .................. 55/343; 55/346; 55/349; 55/429; 55/459.1; 55/DIG. 3
(58) Field of Classification Search .................. 55/343, 55/346, 349, 424, 426, 459.1, 429, DIG. 3
See application file for complete search history.

(56) References Cited

U.S. PATENT DOCUMENTS

| | | | |
|---|---|---|---|
| 1,416,995 | A | 5/1922 | Stroud |
| 3,425,192 | A | 2/1969 | Davis |
| 6,582,489 | B2 | 6/2003 | Conrad |
| 6,607,572 | B2 * | 8/2003 | Gammack et al. ............ 55/343 |
| 6,840,972 | B1 * | 1/2005 | Kim ............................ 55/337 |

FOREIGN PATENT DOCUMENTS

| | | |
|---|---|---|
| CN | 1434688 | 8/2003 |
| DE | 202 05 911 | 7/2002 |
| EP | GB1055151 | 1/1967 |
| EP | 1259330 | 11/2002 |
| EP | 1268076 | 1/2003 |
| EP | 1377196 | 1/2004 |
| EP | 1 413 238 | 4/2004 |
| EP | 1268076 | 10/2004 |
| GB | 1055151 | 1/1962 |
| GB | 1055151 | 1/1967 |
| GB | 2384452 | 7/2003 |
| GB | 2406067 | 3/2005 |
| JP | 5214775 | 8/1993 |

(Continued)

OTHER PUBLICATIONS

Australian Patent Office Examiner's First Report, Jan. 25, 2007.

*Primary Examiner*—Robert A. Hopkins
(74) *Attorney, Agent, or Firm*—Ladas & Parry LLP (57) ABSTRACT

A multi cyclone vessel dust collecting apparatus comprises a first cyclone vessel for centrifugally separating contaminants from drawn in air; a plurality of a second cyclone vessels configured on the first cyclone vessel; and a contaminant collecting unit attached to a bottom portion of the first cyclone vessel. Each of a plurality of the second cyclone vessels are parallel to each other. The center axis line of air rotation movement of the second cyclone vessel is substantially perpendicular to that of the first cyclone vessel. The contaminants collecting unit comprises a body which can be used as a handle.

7 Claims, 5 Drawing Sheets

FOREIGN PATENT DOCUMENTS

| | | |
|---|---|---|
| JP | 2002338280 | 11/2002 |
| JP | 2003-135336 | 5/2003 |
| KR | 010081856 | 8/2001 |
| KR | 010087691 | 9/2001 |
| RU | 2168373 | 6/2001 |
| WO | WO00/74548 | 12/2000 |
| WO | WO0074548 | 12/2000 |
| WO | WO01/60524 | 8/2001 |
| WO | WO 01/60524 | 8/2001 |
| WO | WO0160524 | 8/2001 |
| WO | WO02/082966 | 10/2002 |

* cited by examiner

MULTI CYCLONE VESSEL DUST COLLECTING APPARATUS FOR VACUUM CLEANER

CROSS-REFERENCE TO RELATED APPLICATIONS

This application claims the benefit of Korean Patent Application No. 2004-34185 filed on May 14, 2004, in the Korean Intellectual Property Office, the disclosure of which is incorporated herein by reference in its entirety.

FIELD OF THE INVENTION

The present invention relates to a vacuum cleaner, and more particularly to a cyclone vessel dust collecting apparatus which centrifugally separates and collects various contaminants from the air.

BACKGROUND OF THE INVENTION

Generally, a vacuum cleaner such as upright type or canister type comprises a suction brush, which is connected with a main body and moves along the cleaning surface. The inside of the main body includes a dust chamber having a detachable dust filter; and a motor driving chamber for having a motor providing a suction force. When the motor is run a suction force is generated at the suction brush. Air containing dusts and various contaminants is drawn from the cleaning surface into the main body by the suction force. The drawn air is routed into the dust filter mounted to the dust chamber of the main body. Various contaminants in the air are collected in the dust filter, and clean air is discharged via the motor driving chamber to the outside.

In a prior art vacuum cleaner as described above, however, the dust filter is a consumable goods. When the dust filter is filled with contaminants, the dust filter should be changed. When a dirty dust filter is replaced, a person must actually handle the filter, which is inconvenient, unsanitary and often causes dirt in the filter to be lost to the ground, requiring the dirt lost from the dirty filter to be vacuumed a second time. As such, it is inconvenient and unsanitary.

To overcome the above drawbacks of vacuum cleaner filters, a cyclone vessel dust collecting apparatus, of which collection efficiency is high and which can be used for a permanent or semi-permanent span after removing the filtered contaminants, has been developed and is now widely used. Prior art cyclone vessel dust collecting apparatus' use the principal of centrifugal separation by which dusts are separated from air and collected.

The cyclone vessel dust collecting apparatus does not use a conventional dust bag or dust filter but instead has a semi-permanent cyclone vessel dust collecting structure. These prior art cyclone vessel dust collecting apparatus' however unable to collect many minutely-sized dusts which are instead passed through a cyclone vessel dust collecting apparatus. A cyclone vessel dust collecting apparatus, which can collect minute dusts, would be an improvement over the prior art.

SUMMARY OF THE INVENTION

The present invention provides an improved cyclone vessel dust collecting apparatus having an improved ability to collect minute dusts.

The cyclone vessel dust collecting apparatus comprises a first cyclone vessel chamber having a suction port and an air discharge port; a plurality of a second cyclone vessel connected with the first cyclone vessel in fluid-communication therewith; a contaminant collecting unit for collecting contaminants separated in the first cyclone vessel and a plurality of the second cyclone vessels. The plurality of second cyclone vessels are in a line and arranged in parallel.

Each of the second cyclone vessel vessles comprises a second cyclone vessel body having a second chamber smaller in size than the first chamber, an air suction port configured on a bottom portion of the second cyclone vessel body and connected with the first air discharge port in fluid-communication, and a second air discharge port configured at one side of the second cyclone vessel body, The first cyclone vessel has an upright center axis line such that air ascends substantially vertically and is discharged in a rotational motion. A plurality of the second cyclone vessels are arranged in parallel and have a center axis line perpendicular to that of the first cyclone vessel such that air from each of the first cyclone vessels flows horizontally by a rotational air movement and is discharged.

A contaminant collecting unit in fluid communication with the cyclone vessels comprises a collecting receptacle body having a first dust chamber and a second dust chamber divided by a partition.

BRIEF DESCRIPTION OF THE DRAWINGS

The above and other aspects, features and advantages of the present invention will be more apparent from the following detailed description taken with reference to the accompanying drawings, in which.

DETAILED DESCRIPTION OF THE PREFERRED EMBODIMENTS

Certain embodiments of the present invention will be described in greater detail with reference to the accompanying drawings.

In the following description, drawing reference numerals are used for the same elements in different drawings. The embodiments described herein are only examples and not intended to be limiting. Rather, the invention disclosed herein is set forth in the appurtenant claims. Also, well-known functions and structures are not described in detail since they would tend to obscure the invention in unnecessary detail.

Figure 1:
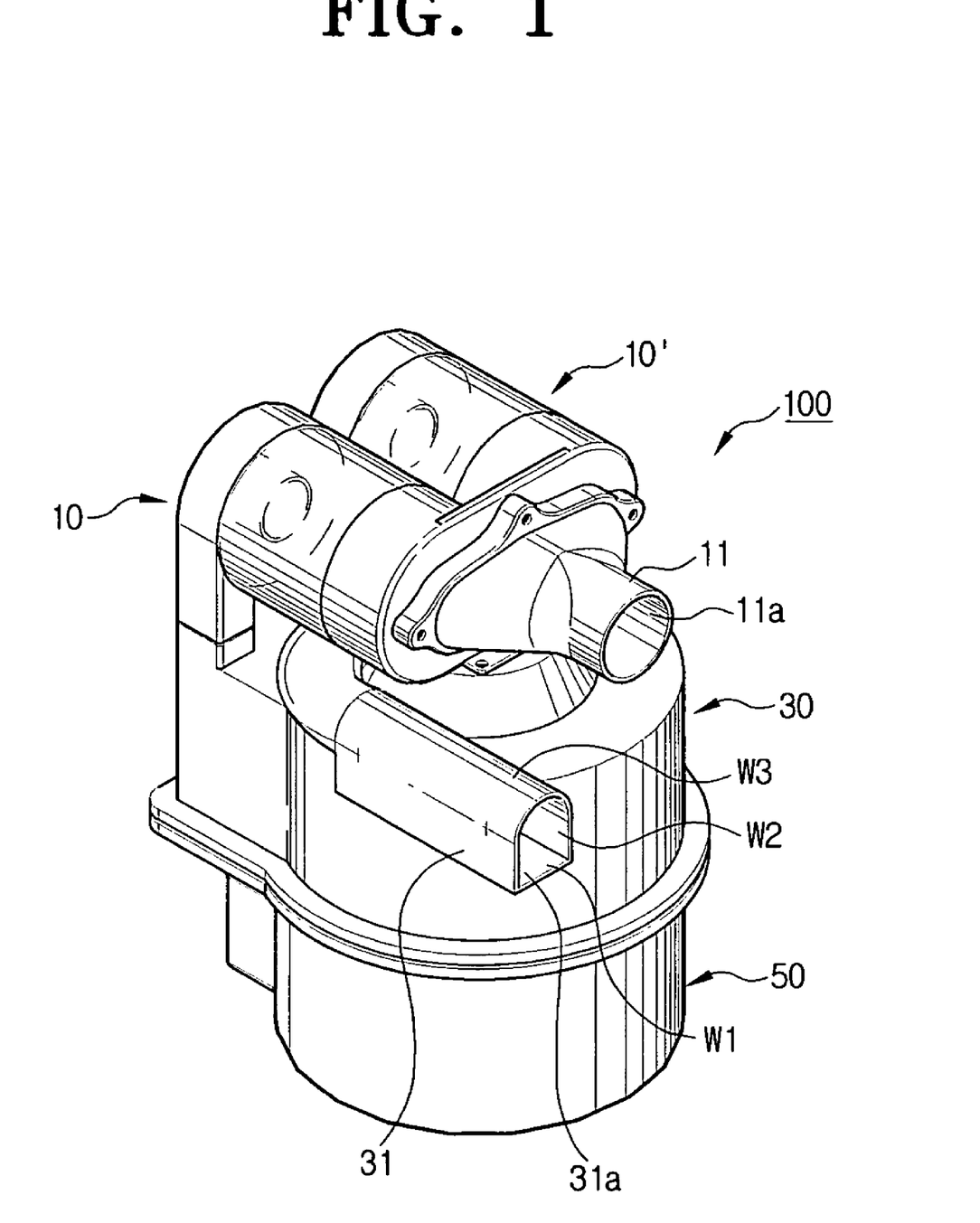
FIG. 1 is a perspective view of a multi cyclone vessel dust collecting apparatus, showing one example of multi cyclone vessel dust collecting apparatus according to an embodiment of the present invention.

FIG. 1 is a perspective view of multi cyclone vessel dust collecting apparatus 100 according to an embodiment of the present invention.

Referring to FIG. 1, the multi cyclone vessel dust collecting apparatus 100 comprises a first cyclone vessel 30, a plurality of second cyclone vessels 10 and 10' in fluid communication with the upper portion of the first cyclone vessel 30 and a contaminants collecting unit 50 in fluid communication with the lower portion of the first cyclone vessel 30.

Figure 2:
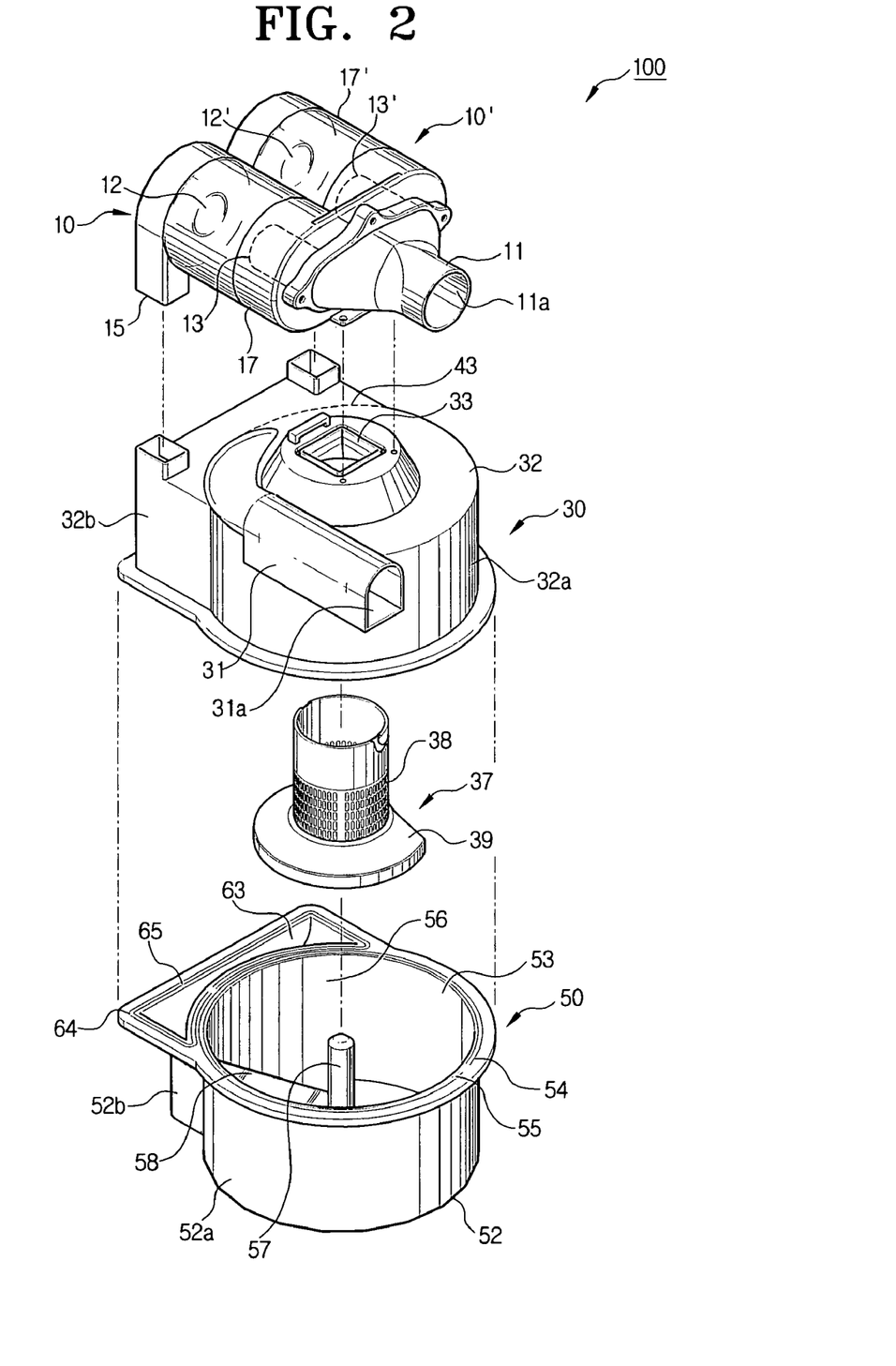
FIG. 2 is an exploded perspective view of the structure shown in FIG. 1.
Figure 5:
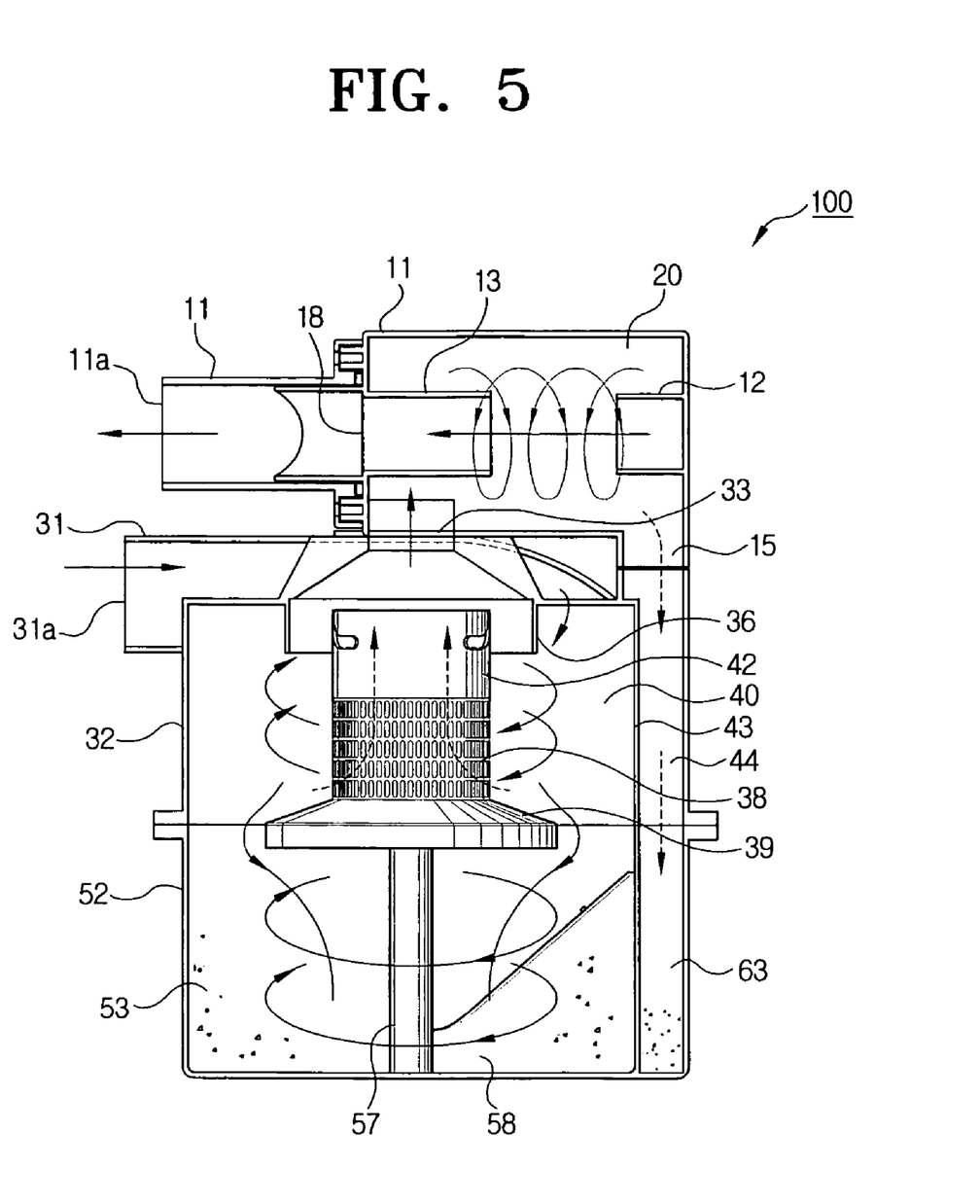
FIG. 5 is a cross-sectional view of the device shown in FIG. 1.

Referring to FIGS. 2 and 5, the first cyclone vessel 30 comprises a first cyclone vessel body 32, a suction port 31 through which contaminant-bearing air is drawn, from which the contaminant-bearing air flows into the first cyclone vessel body 32. A first air discharge port 33 for the first cyclone vessel body 32 is located on the upper portion of the first cyclone vessel body 32. Air exits the discharge port 33 after it passes through a grill member 37 that is in fluid communication with the first air discharge port 33.

As can be seen in the figures, the bottom of the first cyclone vessel body 32 is open. The inside of the first cyclone vessel body 32 is divided into a first chamber 40 and a third chamber 44 by a partition 43. The first chamber 40 of the first cyclone vessel 30 is formed such that air drawn-in through the suction port 31 flows downwardly from the end of the suction port 31 into the first chamber 40 where it rotates in a cyclonic fashion. From there, the air flows through a grill member 37 upwardly through the interior or center of the grill member body 38 to the discharge port 33.

The third chamber 44 guides dusts flowed in through a dust discharge pipe 15 of the second cyclone 30 to a second dust chamber 63 of the contaminants collecting unit 50 which will be explained later. The first chamber body 32a forming an external appearance of the first chamber 40 takes on the configuration of a cylinder, and the third chamber body 32b forming an external appearance of the third chamber takes on the configuration of a prism. As such, the middle part of the third chamber 44 is smaller than the end parts in cross-section.

The first air discharge part 33 is configured on the top portion of the first cyclone vessel body 32, and the interior of a funnel-shaped air guiding part 36, that is connected with the first air discharge port 33. As shown in FIG. 5, the "mouth" of the funnel-shaped air guiding port 36 faces downwardly. The air guiding part 36 is considered to be funnel-shaped because it tapered, such that it has a gradually decreasing diameter from the mouth that narrows in the upward direction and then straightens to a substantially fixed diameter, the end of which is coupled to the air discharge part 33. Air that flows in through the suction port 31, however, passes over the exterior surface of the guiding part 36, imparting to the inwardly-flowing air, a curling motion by its downward movement over the increasingly-widening air guiding part 36.

The suction port 31 guides the air containing contaminants into the first cyclone vessel body 32. The suction port 31 has an entrance 31a that is comprised of a planar bottom W1, vertical side walls W2 and an upper dome-shaped section W3 as shown in FIG. 1. The upper dome W3 is extended through the suction port to the air guiding part 36. The suction port 31 therefore gradually guides the air drawn in through the port 31a to a lower elevation in the first cyclone vessel body 32. The tapered shape of the air guiding part 36 guides the drawn air to follow an increasingly wider radius of curvature as it follows along the exterior of the air guiding part 36 that is inclined downwardly. The increasing radius of curvature causes an increases in the centrifugal force exerted on particles that are suspended in the drawn-in air. As such, the movement of air drawn in through the suction port 31 can be smoothly guided. Specifically, the air is guided not along an acute angle but along a rounded surface such that a turbulence can be minimized and centrifugal force increased. Because the centrifugal force increases, the centrifugal separation efficiency of contaminants also increases.

A grill member 37 prevents large contaminants from flowing to the first air discharge port 33 when the large contaminants centrifugally separated from the first cyclone vessel body 32 are flowed backward. The grill member 37 comprises a grill member body 38 and a skirt 39. The grill member body 38 has a plurality of minute holes, and an outwardly tapered skirt 39 extends from the lower end of the grill member body 38. The grill member body 38 has an open top end, and takes on a configuration of a cylinder. Air that passes through the grill member body 38 flows upwardly toward the upper end of the grill member body 38. The upper end of the grill member body 38 is in fluid communication with the first air discharge port 33. The grill member body 38 has a closed bottom end. The skirt 39 is extendedly configured from the circumference of the bottom end. The bottom of the skirt 39 portion has an outside diameter that is smaller than the inside diameter of the first chamber 40 of the first cyclone vessel body 32. The skirt 39 prevents contaminants that are centrifugally separated in the first cyclone vessel body 32, and which drop downwardly, from flowing upwardly or backward, thereby preventing them from escaping from the apparatus 100.

Figure 3:
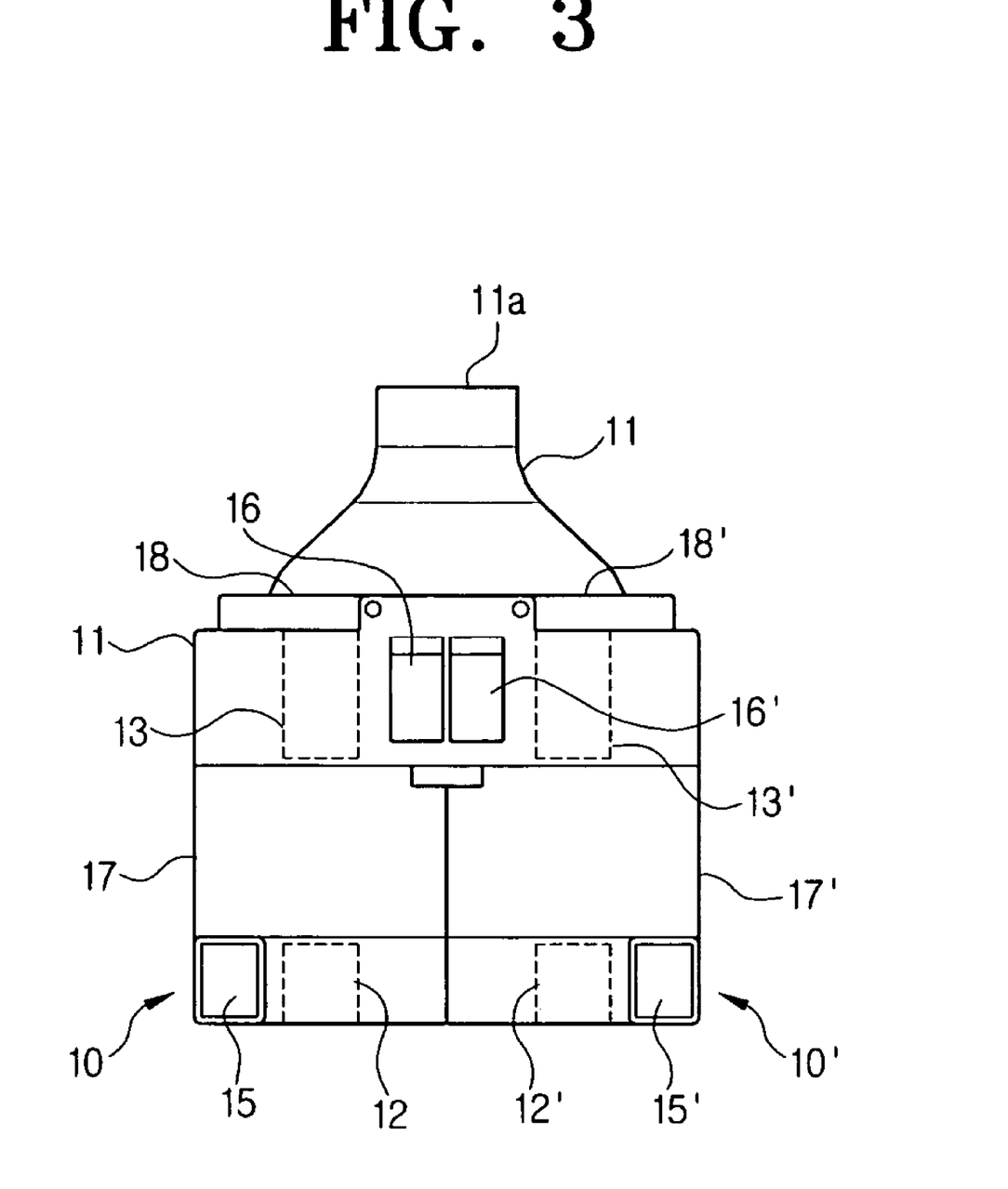
FIG. 3 is a bottom view of a second cyclone vessel of FIG. 2.

Referring to FIGS. 2 and 3, two of the second cyclone vessels 10 and 10' are in fluid communication with the exhaust port 11, and each of the second cyclone vessels 10 and 10' comprise second cyclone vessel bodies 17 and 17', first pipes 12 and 12' configured in the second cyclone vessel bodies 17 and 17', intake air ports 16 and 16', dust discharge pipes 15 and 15', and second air discharge ports 18 and 18' connected with the exhaust port 11 in fluid-communication.

Each of the second cyclone vessels 10 and 10' has the same structure and operates the same, therefore, the structure and operation of only one of the second cyclone vessel 10 will be explained hereinafter.

The second cyclone vessel body 17 comprises a second chamber 20 for rotating air drawn in from the first cyclone vessel 30. The first pipe 12 and the second pipe 13 that extend into the second cyclone vessel body 17 assist in providing a smooth rotation of the air that flows into the second cyclone vessel body 17.

The first pipe 12 and the second pipe 13 are coaxial with each other and face each other as shown in FIG. 2. Air that flows into the second chamber 20 experiences a second centrifugal-separation, hits one side of the second cyclone vessel body 17, while rotating, and heads for the other side of the second cyclone vessel body 17 where it is discharged from the exhaust port 11. Note that if there is no guide member nor center axis for guiding the rotating air stream, the air stream's rotational velocity decreases such that the centrifugal separation efficiency decreases. As such, the first and the second pipes 12 and 13 function as a center axis of the rotating air stream, and the air flowing through the second chamber 20 can be smoothly rotated such that the secondly centrifugal separation efficiency can be maximized.

The two second cyclone vessels 10 and 10' are arranged in parallel such that air flows into them at substantially the same time and at substantially the same rate. The second cyclone vessels 10 and 10' are also physically adjacent to each other.

Referring to FIG. 5, the center axis line of whirling motion of the air flowing into the first chamber 40 is perpendicularly configured so that the flowed air is perpendicularly discharged while whirling. The center axis line of whirling motion in the second chamber 20 is substantially perpendicular to the center axis line in the first chamber 40 such that the air in the second chamber 20 flowed from the first chamber 40 horizontally flows and is discharged while whirling.

As shown in FIG. 3, an intake air port 16 is provided in the "bottom" of the second cyclone vessel body 10 to mate with the first air discharge port 33 of the first cyclone vessel 30. Air flows upwardly through this intake air port from the first air discharge port 33 and as it does so, it begins to curl around the first and second pipes 12 and 13. As such, a single air discharge port 33 of the first cyclone vessel 30 is sufficient and does not need to be duplicated to accommodate the dual second cyclone vessels 10 and 10' and manufacturing is simplified and its cost reduced.

As shown in FIG. 5, a second air discharge port 18 is formed to be tangential to one side of the second cyclone vessel body 17. Each of the second air discharge ports 18 and 18' are connected to the one exhaust port 11.

A dust discharge pipe 15 is located at one end of the second cyclone vessel body 17, and guides minute dusts downwardly that are centrifugally separated from air via the third chamber 44 of the first cyclone vessel 30 to the second dust chamber of the contaminants collecting unit 50 (refer to FIG. 5).

Two of the second cyclone vessels 10 and 10' are depicted and explained in the present embodiment, but this should not be considered as limiting. The second cyclone vessels can be provided more than two without doubt.

Figure 4:
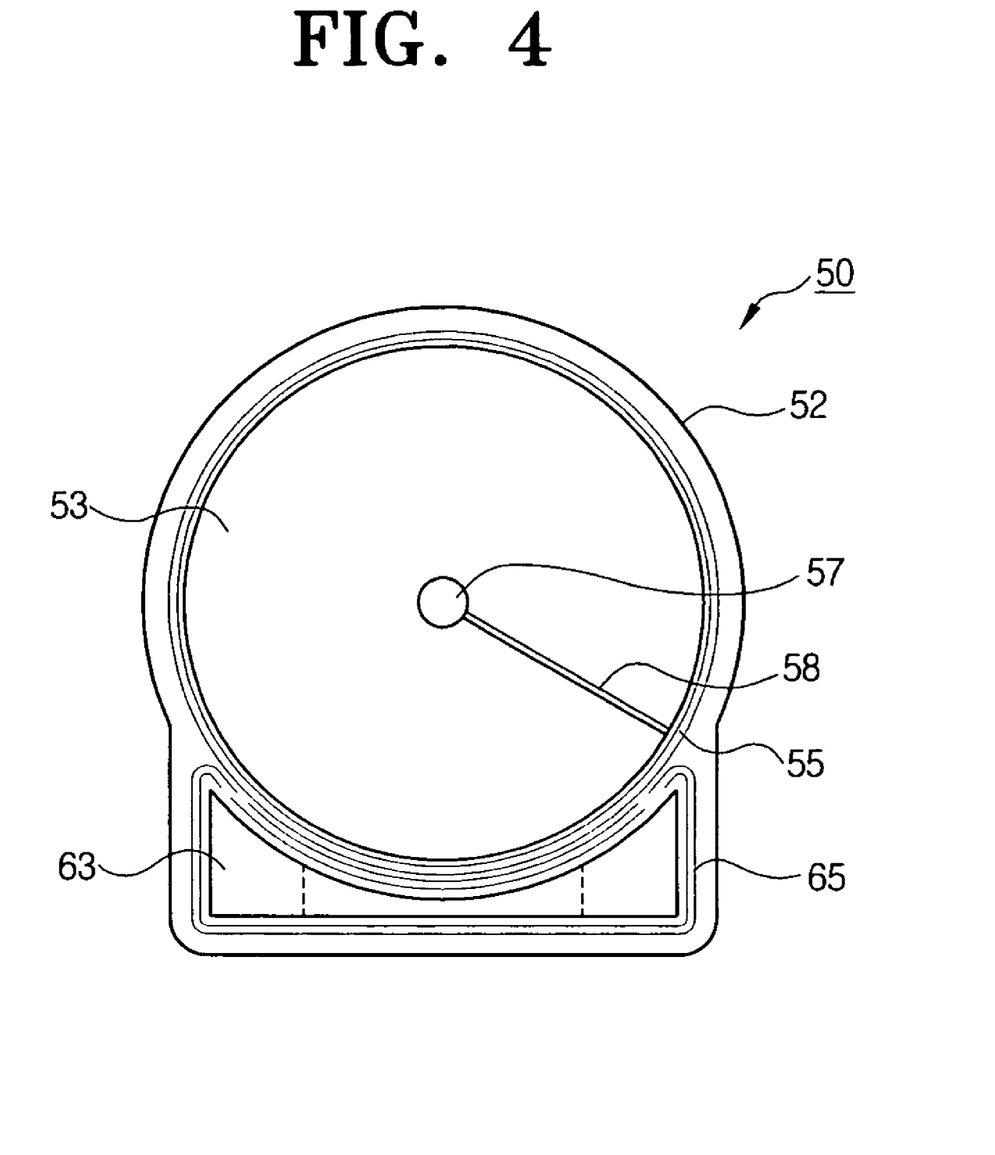
FIG. 4 is a plan view of a contaminants collecting unit of FIG. 2.

Referring to FIGS. 2 and 4, a contaminants collecting unit 50 is detachably attached to the bottom portion of the first cyclone vessel 30. The contaminants collecting unit 50 collects both large contaminants and minute dust particles that are centrifugally separated from each in the first cyclone vessel 30 and the second cyclone vessel 10 and 10'. The contaminants collecting unit 50 is divided by a partition 56 in the collecting receptacle body 52 into a first dust chamber 53 and a second dust chamber 63.

Large contaminants are collected in the first dust chamber 53 as the contaminants are separated from air in the first cyclone vessel 30, and minute dusts are collected in the second dust chamber 63 as the dusts are separated from air in a plurality of the second cyclone vessels 10 and 10'. Because relatively large contaminants are collected, the first dust chamber 53 may be sized larger than the second dust chamber 63. The collecting receptacle body 52*a* forming an external appearance of the first dust chamber 53 takes on the configuration of cylinder corresponding to the first cyclone vessel body 32, and the second collecting receptacle body 52*b* forming an external appearance of the second dust chamber 63 has a square cross section. The cross sectional area of the lower portion of the second collecting receptacle body 52*b* is comparatively smaller than that of the upper portion such that a user can easily detach from and attach to the contaminants collecting receptacle. As such, a user can simply detach and attach the contaminants collecting unit 50 from and to the collecting receptacle body 52*a* to remove contaminants, without separating the whole cyclone vessel dust collecting apparatus from a cleaner body (not shown) and requiring a separate handle. The collecting receptacle body 52 may be made of transparent material. Accordingly, if a cyclone vessel dust collecting apparatus according to an embodiment of the present invention is applied to a cleaner, a user can check the amount of contaminants collected in the contaminants collecting unit without separating the contaminants collecting unit.

As best shown in FIG. 2, a first engagement groove 54 and a second engagement groove 64 are configured on the top portion of the collecting receptacle body 52. First and second sealing members 55 and 65 are mounted in each of the engagement grooves 54 and 64. The first and second sealing member may be separately provided to be mounted in each of the first engagement groove 54 and the second engagement groove 64. However, the sealing member can be mounted as one body for convenience of manufacturing. When the contaminants collecting unit 50 is attached to the first cyclone vessel 30, the bottom portion of outer wall of the first cyclone vessel body 32 is inserted in the first engagement groove 54 and the second engagement groove 64 and sealed. As such, the first chamber 40 and the first dust chamber 53 form one independent room for collecting large contaminants. A plurality of the third chamber 44 connected with a plurality of the second chamber 20 in fluid-communication and the second dust chamber 63 together form another independent room for collecting minute dusts.

A rotation prevention rib 58 and rotation guide shaft 57 are provided in the first dust chamber 53. The rotation prevention rib 58 prevents contaminants flowing in the first dust chamber 53 from flowing by a rotating air stream outwardly therefrom. One rotation prevention rib 58 is mounted in the first dust chamber 53 according to the present embodiment, but this should not be considered as limiting. Two or four of several rotation prevention ribs can be used in a variety of forms.

A rotation guide shaft 57 is mounted to a substantially center of the first dust chamber 53, and assists the air flowed in the first chamber 40 to smoothly form a rotating air stream. The air flowed in the first dust chamber 53 is rotated on the rotation guide shaft 57.

The operation effect of a cyclone vessel dust collecting apparatus having the above structure according to an embodiment of the present invention will be explained in detail hereafter.

Referring to FIGS. 2 and 5, air containing contaminants flows through the suction port 31. The air is guided to the air guiding part 36 and forms a rotating air stream such that the air flows into the first chamber 40 of the first cyclone vessel body 32. Comparatively large contaminants fall and are collected in the first dust chamber 53 of the contaminants collecting unit 50 by a centrifugal operation of the flowed in rotating air stream. Comparatively clean air moves out of the air discharge port 33 via the grill member 37. The air ascends via the air discharge port 33 and flows into each of a plurality of the second cyclone vessel bodies 17 and 17' via the air port 16. The air then flows into the second chamber 20 of the second cyclone vessel body 17, and hits the second cyclone vessel body 17. The air is guided to a rotating air stream by the first and second pipes 12 and 13 such that centrifugal operation is secondly performed in the second cyclone vessel 10 and 10'. As such, in each of the second cyclone vessels 10 and 10', minute dusts having not yet been separated in the first cyclone vessel 30 move out though the dust discharge pipe 15 and are separated via the third chamber 44 of the first cyclone vessel 30 such that the minute dusts are collected in the second dust chamber 63 of the contaminants collecting unit 50. The rotating air stream is discharged toward the discharge port 18. The air discharged from each of the discharge ports 18 and 18' is mixed via the exhaust port 11 and moves out through a certain path. A driving motor may be directly or indirectly connected in the exhaust port 11 to provide a suction force. A driving motor may be connected toward the suction port 31.

Comparatively large contaminants may be mostly collected via the first cyclone vessel 30 having a relatively large capacity. Minute dusts having not yet been separated in the first cyclone vessel 30 are separated in the second cyclone vessel 10 such that dust collecting efficiency can increase. Particularly, a plurality of the second cyclone vessels 10 are arranged in parallel to each other and locate above or on the top portion of the first cyclone vessel 30, and have an air rotation center axis substantially perpendicular to an air rotation center axis of the first cyclone vessel such that collecting efficiency of minute dusts can increase.

Those of ordinary skill in the art will recognize that the multi cyclone vessel dust collecting apparatus 100 as set forth above can be readily applied to various forms of cleaners and suspended particulate separator. In that regard, the apparatus described above finds application as a particulate separator and not just for use in a vacuum cleaner.

As described above, a double cyclone vessel dust collecting apparatus according to embodiment of the present invention comprises the first cyclone vessel 30 and the second cyclone vessel 10 for sequentially separating contaminants such that dust collecting efficiency can increase. Particularly, multi cyclone vessels are formed, that is, a plurality of the second cyclone vessels 10 are in a line and parallel-arranged on the top portion of the first cyclone vessel 30 such that minute dusts having not yet been separated from the first cyclone vessel 30 can effectively be separated. Additionally, contaminants collecting unit is easy to mount and dismount such that collected contaminants can be removed without requiring a separate handle or separating the whole cyclone vessel dust collecting apparatus from a cleaner.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi cyclone vessel dust collecting apparatus for separating and collecting contaminants from an air by a centrifugal force, comprising:
    a first cyclone vessel having a suction port and an air discharge port;
    a plurality of a second cyclone vessels, at least one of which is operatively coupled to the first cyclone vessel;
    a contaminant collecting unit for collecting contaminants separated from the first cyclone vessel and at least one of the plurality of the second cyclone vessels, wherein the plurality of the second cyclone vessels are arranged to be parallel to each other; and
    wherein the first cyclone vessel has a suction port, a first cyclone vessel body having a first chamber therein and a first air discharge port configured on a top portion of the first cyclone vessel body, each of a plurality of the second cyclone vessels comprises a second cyclone vessel body having a second chamber in a smaller size than the first chamber, an air suction port configured on a bottom portion of the second cyclone vessel body and connected with the first air discharge port in fluid-communication, and a second air discharge port configured at one side of the second cyclone vessel body, the first cyclone vessel has a upright center axis line such that air is ascended substantially upright and discharged in a rotation movement, and
    a plurality of the second cyclone vessels are arranged in parallel and have a center axis line perpendicular to that of the first cyclone vessel such that air from each of the first cyclone vessels horizontally flows by a rotation movement and is discharged.

2. The multi cyclone vessel dust collecting apparatus according to claim 1, wherein each of a plurality of the cyclone vessels further comprises:
    coaxial pipes configured opposite each other and functioning as a center axis of a rotating air stream in the second chamber.

3. The cyclone vessel dust collecting apparatus according to claim 2, wherein the second cyclone vessel further comprises:
    a dust discharge pipe oppositely configured to the second air discharge port, and
    the first cyclone vessel further comprises a third chamber connected with the dust discharge pipe in fluid-communication such that dusts flowed through the dust discharge pipe are guided to the contaminants collecting unit.

4. The multi cyclone vessel dust collecting apparatus according to claim 3, wherein the third chamber is separated from the first chamber by a partition.

5. The multi cyclone vessel dust collecting apparatus according to claim 4, wherein the contaminants collecting unit comprises:
    a collecting receptacle body having a first dust chamber and a second dust chamber divided by a partition, and
    the first dust chamber is connected with the first chamber in fluid-communication, and the second dust chamber is connected with the third chamber in fluid-communication.

6. The multi cyclone vessel dust collecting apparatus according to claim 5, wherein the contaminants collecting unit further comprises:
    first and second engagement grooves configured on a top portion of the collecting receptacle body corresponding to the first dust chamber and the second dust chamber; and
    first and second sealing members configured to mate with the first and second engagement grooves.

7. The multi cyclone vessel dust collecting apparatus according to claim 5, wherein the collecting receptacle body includes a handle for attaching and detaching the contaminants collecting unit.

* * * * *